2,847,314
METHOD FOR MAKING CERAMIC ARTICLES

Joseph R. Fisher, Chatham, N. J., assignor to Bell Telephone Laboratories, Incorporated, New York, N. Y., a corporation of New York No Drawing. Application June 2, 1955
Serial No. 512,891

8 Claims. (Cl. 106—39)

This invention relates to methods of making ceramic articles using compositions containing a temporary organic binder and plasticizer.

More particularly this invention relates to the use of polymethacrylic acid as a temporary binder and plasticizer for ceramic materials where shaping as by extrusion or wet pressing is to be employed in forming articles of the ceramic. After forming, the temporary binder is removable by firing the shaped article.

A temporary binder and plasticizer should have a number of different properties to render it suitable for general use in compounding mixtures of raw ceramic materials. In the past, natural products, such as starch, or various synthetic organic materials have been used as temporary binders or plasticizers with some success. The advantage accruing from the exploitation of a few desirable properties of those materials has often been offset by their failure also to combine other essential qualities. Polymethacrylic acid combines many of the requisites of a good temporary binder and plasticizer and tends, consequently, to be more generally adaptable to use in a variety of situations than do other materials previously used.

In the preparation of ceramic articles shaped by extrusion or wet pressing, a number of processes well known in the art are involved. Generally, the ceramic components of the mixture to be used for shaping are initially ball-milled in the presence of water for a period of 16 to 20 hours. A binder is advantageously added to the composition during the milling step. The mixture is then filtered by a vacuum or pressure filtration, and any excess water remaining in the solid ingredients may be further removed by drying at 90° C. to 100° C. till the proper moisture content and consistency for extruding is reached. If shaping is to be by a wet pressing process, a drier material is generally used. A granulated ceramic containing from 2 percent by weight to 5 percent by weight of moisture is preferred.

The shaping by extrusion or wet pressing is done using techniques well known to those skilled in the art.

After shaping, the ceramic articles are usually dried at room temperature for several days, and are then finally fired.

In each of these steps, a temporary binder and plasticizer has specific functions, and, ideally, should have properties which enable it to fulfill all the requirements imposed by the process.

Thus, a binder is preferably to be water-soluble to permit its inclusion in the ceramic mixture at some time during the ball-milling. In this way an adequate dispersion of the added material throughout the inorganic ceramic composition is insured. In the filtration step which follows, the binder, though water soluble, should preferably be retained largely with the solids, rather than being lost in the filtrate. Excessive loss with the filtrate may require a subsequent addition of binder to the filter cake. This is an inefficient process which may not achieve as thorough a dispersion of binder throughout the solids as does adding the binder while ball-milling.

In the shaping process, the binder is most effective if acting also as a plasticizer and a parting compound or lubricant. It preferably should both lend a moldable consistency to the ceramic mass and facilitate extrusion or wet pressing by reducing adhesion of the shaped material to smooth metal parts.

The binder's principal function is to keep the shaped ceramic articles in the form desired during the drying process. During the drying and aging steps, prior to firing, a strong shaped body is needed to reduce loss by breakage incurred in handling and storing the articles. Those binders which give greatest dry strength to the shaped bodies are generally most acceptable, though, again, other properties are also requisite. For example, during the drying process some binders may show a tendency to migration and concentration; that is, some of the binder may work to the surface of the shaped article, forming a skin over the ceramic solids. Upon later firing, the presence of this skin may encourage the formation of blow-holes, or may lead to the development of cracks and similar structural defects as the temporary binder is removed. To remedy such behavior, it is desirable to use a binder which will remain dispersed throughout the ceramic solids during drying and aging.

Upon firing, the most advantageous temporary binder is one which may be removed easily at low temperatures. Its pyrolysis should occur without softening of the binder prior to its removal, with a gentle evolution of vaporized material, if any, and without the production of noxious by-products. For greater versatility of application, the firing process is best when there is no necessity for oxidizing atmospheres.

Finally, to make handling and storage safe and efficient, a binder is to be preferred if neither toxic nor irritating to the skin, and if neither it nor its solutions are susceptible to attrition by fungi or bacteria.

Polymethacrylic acid is eminently suited as a binder by virtue of its conformance with the specifications mentioned in the paragraphs above. This substance is water-soluble, is largely retained in the ceramic solids upon filtration, and functions also as a plasticizer and lubricant. It gives good dry strength to shaped bodies. Polymethacrylic acid has little tendency to migrate on drying, and depolymerizes and is removed at a controllable rate upon firing in air. It is neither toxic, irritating, nor susceptible to the formation of mold growths.

Though polymethacrylic acid may be added as a dry powder to the ball-mill containing the ceramic constituents of the mixture to be shaped, it is more conveniently dispersed throughout the inorganic mixture in a minimum time by being introduced into the ball-mill when already in solution. An aqueous solution containing 5 percent by weight to 10 percent by weight of polymethacrylic acid is readily prepared. Enough of this solution is then usually added to the ball-milled ingredients so that the polymethacrylic acid is present in quantities approximately 3 percent by weight to 6 percent by weight of the ceramic ingredients excluding water. The addition of the polymethacrylic acid solution is generally made after the initial 16 to 20 hour ball-milling of the ceramics in water, and ball-milling is then carried out for at least one additional hour to disperse the polymethacrylic acid throughout the mixture.

Upon subsequent vacuum or pressure filtration, a major portion of the polymethacrylic acid introduced into the composition will tend to remain with the solids, little being removed in the filtrate. As high a retention as 80 percent has been observed with certain ceramic compositions. Polymethacrylic acid is weakly acidic, and solutions of the concentrations mentioned above have a pH of opproximately 3.8 to 4.0. When the acid is used with ceramics which contain alkaline ingredients, the pH of the normally alkaline filtrate recovered on vacuum or pressure filtration is significantly lowered, presumably by a partial neutralization of basic carbonates and oxides in the ceramics by the acid. The presence of the polymethacrylic acid as a partially neutralized substance

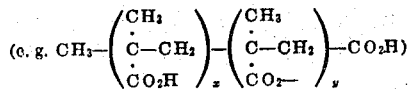

may explain, to some extent, the retention of the acid in the solid ceramic material during filtration, even though the acid is normally quite soluble in aqueous solutions such as the liquid removed during filtration.

The acid is, in fact, most suitable for use with ceramics containing some content of alkaline material. Thus, polymethacrylic acid has been used with steatite, alkaline earth and zircon porcelain ceramics, for example. It has proved particularly effective as a binder with the steatite ceramics described in United States Patent 2,332,343, issued October 19, 1943, to Merle D. Rigterink, the alkaline earth porcelain ceramics taught by United States Patent 2,386,633, issued October 9, 1945, to Merle D. Rigterink, and a zircon porcelain ceramic of the following approximate composition:

| | Percent by weight |
|---|---|
| Zirconium silicate | 50 |
| Calcium zirconium silicate | 25 |
| Kentucky No. 4 ball clay | 25 |

Polymethacrylic acid may be used as a binder for still other ceramic compositions containing alkaline ingredients. Some alkaline metallic oxides form cements upon hydration however, and may prove unsuitable for processing by the techniques using water which are described herein. If such oxides forming cements on hydration, as magnesium oxide and calcium oxide, are desired as constituents in a ceramic to be processed with aqueous solutions, as here contemplated, compounds of the metal other than the oxides are preferably chosen as starting materials. Conversion of such compounds to the desired oxides may be brought about later, as by decomposition during the final firing of the ceramic.

The existence of the acid as a partially neutralized species in alkaline ceramic mixtures as are described above may be viewed as explanatory also of the extraordinary dry strength of the shaped ceramics containing polymethacrylic acid as a binder. Further, during the drying of the shaped articles, which is done either in air at room temperature or by slow heating to drive off excess water, there is a lack of extensive migration and concentration of the acid binder. These observations tend to support the hypothesis that strong, possibly ionic, bonds are formed between the partially neutralized acid and partially neutralized basic constituents in the ceramic mixture.

Firing of the shaped and dried ceramics to remove the binder is preferably done at temperatures below 600° C. Depolymerization of the polymethacrylic acid binder proceeds at a temperature of about 200° C., with charring becoming apparent as the oven temperature rises to about 300° C. The binder is, essentially, completely removed at temperature between 400° C. and 600° C., with the range from 500° C. to 550° C. being particularly convenient for firing. These intermediate firings to remove the polymethacrylic acid may proceed in air, with no special firing atmosphere being required. The vapors produced on decomposition or depolymerization are not dangerously toxic.

The pressed or extruded articles are subsequently fired at more elevated temperatures to sinter the ceramics. The temperature and length of this latter firing is determined by the ceramic being so treated. Thus, for the ceramic compositions taught in the aforementioned Patent No. 2,332,343, issued to Merle D. Rigterink, final firing is usually done at temperatures between 1100° C. and 1300° C. for a time sufficient to vitrify the ceramic.

The porcelain ceramics taught in Patent No. 2,386,663, issued to Merle D. Rigterink, are fired to vitrification at temperatures between about 1150° C. and about 1300° C.

Similarly, the zircon porcelain ceramics mentioned above are vitrified at temperatures between 1100° C. and 1300° C. For this material, a one-hour or two-hour firing period at 1220° C. has been found advantageous.

Polymethacrylic acid and its aqueous solutions may be handled safely. They are non-poisonous and non-irritating to most individuals. Solutions of polymethacrylic acid, as mentioned, are stable with respect to the biologically-caused deterioration to which natural materials, such as starch or flour, are often susceptible.

The polymethacrylic acid which may be used as a binder for ceramic compositions, as herein taught, advantageously has a Brookfield viscosity between 7.5 centipoises and 25 centipoises at 75° F., measured on a 2 percent solution of the polymer in water. Better results are obtained if the acid shows a Brookfield viscosity in the narrower range between 10 centipoises and 20 centipoises under the same conditions of concentration and temperature. A 2 percent aqueous solution of the most preferred material has a viscosity of 15 centipoises at 75° F.

A 2 percent aqueous solution of this latter preferred material has, additionally, a Brookfield viscosity of 19 centipoises at 65° F. and a similarly measured viscosity of 7 centipoises at 85° F., though these values are not critical to the specification of the polymer and are given only to make characterization more convenient. The acid number of a 2 percent solution of the preferred polymer in water, further, is 10.5, expressed in milligrams of potassium hydroxide per milliliter of solution.

Practice of the invention herein described may be illustrated by the following specific embodiment:

*Example 1*

A charge of zircon porcelain ceramic mixture containing 50 parts by weight of zirconium silicate, 25 parts by weight of calcium zirconium silicate, and 25 parts by weight of Kentucky No. 4 ball clay is placed in a ball mill with water to form a thin slurry and is then ball milled for 16 hours. Thirty parts by weight of a 10 percent aqueous solution of polymethacrylic acid are added, the acid having an average molecular weight such that a 2 percent solution of the acid in water has a Brookfield viscosity of 15 centipoises at 75° Fahrenheit. Ball milling is continued for one hour after addition of the acid. The resulting slurry is then vacuum filtered and dried at 100° C. till excess water has been removed and a plastic mass suitable for shaping, containing about 2 percent by weight of moisture, is obtained. The plastic mass is wet-pressed into the desired shape, and the shaped detail dried at room temperature. The polymethacrylic acid binder is removed by heating the dried detail in air to a temperature of 500° C., and the detail is then finally fired for one hour at 1220° C.

Although specific embodiments of this invention have been described, it will be understood that they are only illustrative, and various modifications may be made therein without departing from the scope and spirit of the invention.

What is claimed is:

1. The method of making a shaped body of ceramic materials, which method comprises mixing the finely-divided ingredients of said ceramic material, water, and 3 percent by weight to 6 percent by weight of polymethacrylic acid, calculated on the basis of the dry ingredients, removing excess water to give a plastic mass, forming said mass into a shaped body, drying said body, and firing said body.

2. The method of making a shaped body of ceramic material, which method comprises mixing the finely-divided ingredients of said ceramic material, water, and such quantity of an aqueous solution containing 5 percent by weight to 10 percent by weight of polymethacrylic acid that the polymethacrylic acid in the mixture constitutes 3 percent by weight to 6 percent by weight of the dry ingredients, forming the mass into a shaped body, drying said body, and firing said body.

3. The method as described in claim 1 wherein said ingredients of said ceramic material include at least one alkaline ingredient.

4. The method as described in claim 2 wherein said ingredients of said ceramic material include at least one alkaline ingredient.

5. The method of making a shaped body of ceramic material which comprises mixing the finely-divided ingredients of said ceramic material, water, and 3 percent by weight to 6 percent by weight of polymethacrylic acid, calculated on the basis of the dry ingredients, removing excess water as a liquid phase to give a plastic mass, forming said mass into a shaped body, drying said body, and firing said body.

6. The method as described in claim 5 wherein said polymethacrylic acid is added as an aqueous solution containing 5 percent by weight to 10 percent by weight of polymethacrylic acid.

7. The method of making a shaped body of ceramic material which method comprises mixing the finely-divided ingredients of said ceramic material, water, and 3 percent by weight to 6 percent by weight of polymethacrylic acid, calculated on the basis of the dry ingredients, removing excess water by filtration to give a plastic mass, forming said mass into a shaped body, drying said body, and firing said body.

8. The method as described in claim 7 wherein said finely-divided ingredients of said ceramic material include at least one alkaline ingredient.

References Cited in the file of this patent

UNITED STATES PATENTS

| 2,227,200 | Robie | Dec. 31, 1940 |
| 2,358,211 | Christensen et al. | Sept. 12, 19.. |
| 2,519,280 | Potter et al. | Aug. 15, 19.. |